United States Patent [19]

Bender et al.

[11] Patent Number: 5,288,741

[45] Date of Patent: Feb. 22, 1994

[54] USE OF POLYMERS WHICH CONTAIN UNITS DERIVED FROM 4-HYDROXYSTYRENE OR 4-ACETOXYSTYRENE AS REINFORCING RESINS AND ADHESION PROMOTERS IN RUBBER MIXTURES

[75] Inventors: Albert Bender, Mainz; Erhard Leicht, Hofheim am Taunus; Richard Sattelmeyer, Wiesbaden, all of Fed. Rep. of Germany

[73] Assignee: Roussel-Uclaf, France

[21] Appl. No.: 922,022

[22] Filed: Jul. 28, 1992

Related U.S. Application Data

[63] Continuation of Ser. No. 516,097, Apr. 27, 1990, abandoned.

[30] Foreign Application Priority Data

Apr. 29, 1989 [DE] Fed. Rep. of Germany ....... 3914338

[51] Int. Cl.$^5$ ............................................. C08L 29/10
[52] U.S. Cl. ................................... 525/159; 525/162; 525/163; 525/329.5; 525/381; 525/328.2; 525/328.3; 525/328.8; 525/328.9
[58] Field of Search ............ 526/313, 283, 240, 292.1, 526/298; 525/219, 241, 159, 162, 163, 329.5, 381

[56] References Cited

U.S. PATENT DOCUMENTS 3,849,361 11/1974 Zweigle et al. .
4,129,557 12/1978 Kudo et al. .......................... 526/313
4,338,410 7/1992 Ueno et al. ........................... 525/905

FOREIGN PATENT DOCUMENTS 0097808 5/1983 European Pat. Off. .
0297184 7/1987 European Pat. Off. .
2451599 5/1974 Fed. Rep. of Germany .
7716108 6/1976 France .
56-152852 11/1981 Japan .

OTHER PUBLICATIONS

Antimon und Antimon-Verbindungen bis Brot und andere Backwaren, Ullmanns Encyklopädie der technischen Chemie, 4., vol. 8., Verlag Chemie, Weinheim/-Berstr.
Copy of European Search Report (3 pages).
Copy of vol. 6, No. 35 (C-93) Mar. 3, 1982 Title: Rubber Compositions (1 page).
Title: Rubber Compositions (1 page).
Polyacryl-Verbindungen bis Quecksilber, Ulmanns Encyklopädie der technischen Chemie, 4., vol. 19, Verlag Chemie, Weinheim-Deerfield Beach, Fla.-Basel.

*Primary Examiner*—Bernard Lipman
*Assistant Examiner*—Jeffrey T. Smith
*Attorney, Agent, or Firm*—Bierman and Muserlian

[57] ABSTRACT

Polymers which contain units of 4-hydroxystyrene and-/or of 4-acetoxystyrene, where appropriate in a mixture with other comonomer units, in particular butadiene, can be used in place of phenolic or resorcinol resins as reinforcing resins and adhesion promoters in rubber mixtures. These polymers are distinguished by the fact that, coupled with at least equally good effectiveness, they do not release any phenolic materials into the environment on incorporation into rubber mixtures.

8 Claims, No Drawings

USE OF POLYMERS WHICH CONTAIN UNITS DERIVED FROM 4-HYDROXYSTYRENE OR 4-ACETOXYSTYRENE AS REINFORCING RESINS AND ADHESION PROMOTERS IN RUBBER MIXTURES

PRIOR APPLICATION

This application is a continuation of U.S. patent application Ser. No. 516,097 filed Apr. 27, 1990, now abandoned.

It is known to add reinforcing resins to mixtures of natural or synthetic rubber to improve their mechanical properties, in particular the hardness and the stress values. Adhesion promoters are used to improve the adhesion of vulcanized rubbers to steel cord, especially to brass-coated or galvanized steel cord. Crosslinkable phenolic resins, in general novolaks, and resorcinol or resorcinol precondensates are used for these purposes in combination with formaldehyde-releasing substances or with substances which react with the phenolic resins, resorcinol or the resorcinol precondensates via methylene or methylol groups with crosslinking, for example hexamethylenetetramine and methylol group-containing or - forming melamine and urea resins, which may be partially or completely etherified. The rubber mixtures can be based on natural rubber or the known synthetic rubbers. The reinforcing resins and adhesion promoters are mixed into the rubber mixtures at elevated temperature. Since the precondensates always contain free phenol or resorcinol, expensive precautions must be taken with this process to ensure that these phenolic materials do not get into the environment. This is particularly the case when using free resorcinol. Moreover, resorcinol precondensates, because of their hygroscopic nature, usually contain water. This makes their incorporation into the rubber mixture more difficult and impairs the properties of the vulcanized material prepared therefrom.

The object of the invention was, therefore, to make available reinforcing resins and adhesion promoters for rubber mixtures, which, while having at least equally good effectiveness, do not release phenolic materials into the environment and can be easily incorporated into rubber mixtures.

It has now been found that polymers which contain units which are derived from 4-acetoxystyrene or 4-hydroxystyrene, which may be ring-substituted, are suitable as reinforcing resins and adhesion promoters for rubber mixtures, which is described in more detail in the following text.

Polymers which contain such units are disclosed in European Patent 277,721. According to this patent they are obtained by free radical polymerization of 4-acetoxystyrene, where appropriate in a mixture with other polymerizable monomers, in an aqueous medium. The corresponding 4-hydroxystyrene polymers are obtained from these by saponification. The polymers obtained in this way are usable for the purposes of the invention. However, it is difficult to obtain them free from salt and emulsifier, for which reason free radical or thermal polymerization in organic solvents is preferred for the present purpose.

The polymers to be used according to the invention contain units of the formula (I)

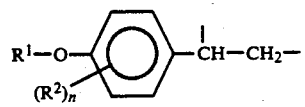

The symbols have the following meaning:
$R^1$ is hydrogen or an acetyl group $CH_3CO-$
$R^2$ is hydrogen or an alkyl or alkoxy group having 1 to 4 carbon atoms or halogen or $-C \equiv N$ and
n is an integer rom 1 to 4 with the proviso that if $n > 1$ the radicals $R^2$ can be identical or different, and that at least in some of the units of the formula (I) there is a hydrogen atom at least in one of the positions vicinal to the $R^1O-$ group.

In preferred embodiments $R^1$ is only hydrogen or only acetyl, $R^2$ only hydrogen and therefore $n=4$. Polymers in which $R^1$ represents acetyl exclusively react relatively sluggishly with the crosslinking agents mentioned above for the known phenol and resorcinol resins, whilst the pure 4-hydroxy compounds are comparable in their reactivity with the known reinforcing resins. The reactivity can be influenced in a controlled manner by the degree of saponification.

The properties of the polymers to be used in accordance with the invention can be modified during their preparation not only by the degree of saponification but also by copolymerization with the co-use of comonomers of the formula (II)

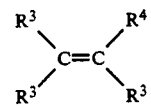

in which the symbols have the following meaning:
$A^3$ are identical or different radicals from the group comprising hydrogen or an alkyl or an alkoxy group having 1 to 4 carbon atoms or halogen or $-C \equiv N$ or $-COOH$ or $-COO(C_1-C_4\text{-alkyl})$ or

p being an integer from 1 to 5,
and
$R^4 = R^3$ or a group

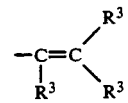

Monomers of the formula (II) are olefins, conjugated dienes, styrene and styrene derivatives, for example ethylene, vinyl chloride, 1,3-butadiene, 2-methyl-1,3-butadiene (isoprene), 5,5-dimethyl-1,3-hexadiene, 2-chloro-1,3-butadiene (chloroprene), 1-phenyl-1,3-butadiene, 1-cyano-1,3-butadiene, styrene and alpha-methylstyrene. Styrene is preferred and butadiene, isoprene and chloroprene are particularly preferred, especially butadiene from the latter group. The incorporation of units which are derived from the 1,3-dienes leads to the co-vulcanizing in of the polymer into the vulcanised material during vulcanization.

Cyclopentadiene and dicyclopentadiene, which copolymerize particularly easily with 4-acetoxystyrene, are also very suitable as comonomers.

By the co-use of comonomers the degree of crosslinking of the polymers can be regulated during the reaction with crosslinking agents. However the amount of the comonomers used should be at most three times the molar amount of, and preferably not more than the same molar amount as, the 4-acetoxystyrene.

The molecular weight of the polymers should be between about 1000 and about 150,000. If a molecular weight of about 150,000 is exceeded sticky products, which are difficult to handle, are obtained, in particular if 1,3-dienes are used as comonomers. Lower molecular weight products can also be sticky if the proportion of 1,3-dienes is very high.

As already mentioned, the polymers or copolymers can be prepared by polymerization in an aqueous medium.

Preferably, however, the polymerization is carried out in organic solvents such as isooctane, dodecane, benzene, toluene, xylene, cumene, methyl ethyl ketone, methyl isobutyl ketone, diisoamyl ketone, ethyl acetate, propanol of butanol. Preferred solvents for the polymerization are toluene, xylene or cumene.

The polymerization can be carried out under the action of heat or by means of free radicals. In general the free radical polymerization proceeds at lower temperatures and consequently at lower pressure. The free radical-forming agents used are known organic peroxides or azo compounds, such as dibenzoyl peroxide, di-tert.-butyl peroxide, dilauroyl peroxide, cumene hydroperoxide, tert.-butyl hydroperoxide and azodiisobutyronitrile, preferably di-tert.-butyl peroxide, in amounts of up to about 5% by weight, preferably up to 2% by weight, relative to the total weight of the monomers.

In general the temperature for the free radical polymerization is 80°-220° C. The pressure is dependent on the temperature and on the nature of the solvent used. Significantly higher temperatures can be necessary for thermal polymerization.

The polymerization can be carried out in such a way that the total amount of monomers and catalyst in a suitable solvent is initially introduced and warmed until the reaction starts. It is also possible initially to introduce the solvent on its own, to preheat it to a temperature suitable for starting the reaction and to meter in monomers and catalyst. All processes known from solution polymerization technology can be used.

To adjust the molecular weight the known regulators are used, in particular sulfur compounds such as thioalcohols, in particular mercaptoethanol or 1-dodecanethiol, thioacids such as mercaptoacetic acid, or disulfides such as xanthogen disulfides. 1-Dodecanethiol in amounts of up to 3% by weight, relative to the total amount of monomers, is preferred.

On completion of the polymerization the polymer can be obtained as solid resin by distilling off the solvent. It can be employed without further purification for the use according to the invention.

The reactivity towards methylene donors, such as hexamethylenetetramine, and towards melamine or urea resins becomes considerably higher if the 4-acetyloxy-styrene units contained in the polymer are entirely or partially saponified to 4-hydroxy-styrene units, by which means polymers are obtained which possess the structure of a polymeric phenol.

To carry out the saponification an aqueous solution or suspension of a base, for example sodium hydroxide, potassium hydroxide, calcium hydroxide or aluminium hydroxide or also ammonia, can be added directly to the solution obtained from the polymerization and, depending on the solvent, the saponification can be carried out in the homogeneous or heterogeneous phase. It is also possible first to obtain the polymer by removing the solvent and to saponify this in the aqueous phase. The saponified polymers are usually soluble in aqueous bases and can be precipitated by acidification with a strong acid. The precipitate is filtered off and carefully washed and dried.

However, it is particularly advantageous to carry out the polymerization in a water-immiscible solvent, such as toluene, xylene or cumene, to carry out the saponification using an aqueous base in heterogeneous phase and to separate aqueous and organic phases before acidification.

The polymers are used instead of known reinforcing resins and adhesion promoters in the known natural and synthetic rubber mixtures, which mixtures are used for the production of automobile tires and of industrial rubber articles.

The crosslinking agents used are the same compounds as are used with the known phenolic and resorcinol resins.

Preferably hexamethylenetetramine and melamine resins, in particular hexamethoxymethylmelamine, are used. The amount of crosslinking agent suitable for the specific purpose must be determined in pretrials, which are simple to carry out. It can, for example, be 2–60% by weight, relative to the weight of the polymer used.

The rubber mixtures can contain the additives, fillers, and auxiliaries which are customary and known in the relevant industry and can be processed in the customary manner.

The following examples serve to illustrate the invention without restricting it.

EXAMPLE 1

1080 g of xylene, 10.8 g of di-tert-butyl peroxide and 810 g of p-acetoxystyrene (5 mols) are initially introduced into a 3-liter autoclave. 135 g (2.5 mols) of butadiene are pumped into this mixture at room temperature. The mixture is then heated to 140° C. over a period of 1 hour. After holding the reaction mixture at 140° C. for 4 hours the pressure, which initially rose to 8 bars, has fallen to 3.4 bars. To complete the reaction the reaction mixture is then heated to 180° C. for a further half hour, a pressure of 4.4 bars developing. The mixture is allowed to cool to 140° C., the pressure is released and the solvent is distilled off, the temperature of the reaction mixture being increased to 200° C. In order to remove the residual solvent the autoclave is evacuated to 60 mbar at this temperature for a further half hour.

After cooling, the resultant copolymer is isolated as a glass-like solid resin in 95% yield (relative to the monomers used). It contains the monomer units p-acetoxystyrene and butadiene in the molar ratio 1:0.5, has a melting point of 95° C. and an average molecular weight ($M_w$) of 52,000.

Examples 2–5 are prepared analogously to Example 1:

| Example | Molar ratio acetoxy-styrene:butadiene | Melting point °C. | Yield % | $M_w$ |
| --- | --- | --- | --- | --- |
| 2 | 1:0.25 | 108 | 95 | 22,000 |
| 3 | 1:0.75 | 87 | 90 | 66,000 |
| 4 | 1:1.0 | 80 | 87 | 380,000 |
| 5 | 1:2.0 | 79 | 75 | 365,000 |

EXAMPLE 6

The procedure is analogous to Example 1, except that 21.6 g (=2% by weight, relative to monomers) of n-dodecylmercaptan are added as molecular weight regulator. A copolymer of glass-like appearance is obtained in 100% yield; melting point 68° C., average molecular weight ($M_w$) 191000.

The following products are prepared analogously to Example 6:

| Example | Molar ratio acetoxy-styrene: butadiene | Addition of regulator in % by weight | Yield % | $M_w$ |
| --- | --- | --- | --- | --- |
| 7 | 1:1 | 1 | 95 | 49,000 |
| 8 | 1:2 | 1 | 87 | 106,000 |
| 9 | 1:1 | 2 | 94 | 36,000 |
| 10 | 1:2 | 2 | 89 | 56,000 |
| 11 | 1:3 | 2 | 92 | 260,000 |

EXAMPLE 12

1000 g of xylene are initially introduced into a 3-liter autoclave. Over a period of 3 hours, 1000 g of p-acetoxystyrene, which contains 10 g of di-tert-butyl peroxide and 20 g of n-dodecylmercaptan are pumped into the solvent, which has been heated to 200° C. The mixture as stirred for a further 1 hour at 200° C. and the pressure is cautiously released (the internal pressure is about 4.5 bars), the solvent beginning to distil off. Any still volatile components are removed by evacuating to 60 mbar for one and a half hours. After cooling, 950 g of a glass-like product with a melting point of 60° C. are obtained (yield: 95%). It has an average molecular weight $M_w$ of 4000.

EXAMPLE 13

190 g of solid resin from Example 1 are used. The product, comminuted to pea-size, is suspended in 270 g of 33% sodium hydroxide solution. The suspension is then warmed to 90° C., the polymeric solid resin slowly beginning to dissolve. After dissolution has taken place, the solution is subsequently stirred for a further 4 hours at 90° C. The solution, cooled to 20° C., is then added dropwise to 200 ml of 37% hydrochloric acid, the hydroxyl group-containing copolymer precipitating out. It is isolated by filtering off, washed acid-free with a large amount of water and dried in an oven at 50° C. to constant weight. 147 g (100% yield) of a colorless powder are obtained, which begins to melt above 100° C.

EXAMPLE 14

The procedure is in accordance with Example 1, except that the solvent is not distilled off. 402 g of this solution are stirred for 4 hours at 90° C. with 80 g of sodium hydroxide, which is dissolved in 300 g of water. The mixture as then allowed to cool to 20° C. and the organic phase (xylene) is separated off. The alkaline aqueous solution is added dropwise to 490 g of ice-cold 20% sulfuric acid, during which addition the temperature should not rise above 10° C. The hydroxyl group-containing copolymer which has precipitated out is filtered off, washed salt and acid-free with a large amount of water and dried at 50° C. in an oven to constant weight. 147 g of a pale yellow-colored powder as obtained, which begins to melt from 100° C. (yield quantitative).

EXAMPLE 15

1616 g of a 50% copolymer solution in xylene are prepared in accordance with Example 3. 348 g of sodium hydroxide in 1410 g of water are added to this solution and the 2-phase mixture is heated to 80° C. After one hour the mixture is allowed to cool to 20° C. and 848 g of 37% hydrochloric acid are added dropwise over a period of 2 hours at such a rate that the temperature does not rise above 20° C. The precipitate is filtered off with suction and subsequently washed twice with 1000 g of cold water. It is then dried to constant weight at 50° C. in a vacuum oven. 633 g (100% yield) of a colorless powder with a melting point of 100° C. are obtained.

EXAMPLE 16

950 g of homopolymer are prepared in accordance with Example 12. The comminuted product, with the addition of 200 g of xylene, is heated to 90° C. with 465 g of sodium hydroxide in 1800 g of water. After one hour, the mixture is allowed to cool to 20° C. and the product is precipitated out with 1131 g of 37% hydrochloric acid. It is filtered off with suction, washed acid-free with water and dried to constant weight at 40° C. in a vacuum oven. 695 g (100% yield) of a colorless powder with a melting point of 85° C. are obtained.

EXAMPLE 17

Acetyl group-containing copolymers with a high butadiene content are prepared in accordance with Example 4, 5, 10 and 11. The products are saponified in accordance with Example 13 or 14. Hydroxyl group-containing copolymers are obtained in quantitative yield.

The copolymers are sticky and therefore difficult to handle and process.

EXAMPLE 18

400 g of xylene are initially introduced into a 3 l autoclave. Over a period of 3 hours a mixture of 600 g (3.7 mols) of p-acetoxystyrene, 200 g (1.9 mols) of styrene, 8 g of dibenzoyl peroxide, 16 g of n-dodecylmercaptan and 200 g of xylene is pumped into the solvent, which has been heated to 180° C. The mixture is allowed to react further for a further 1 hour at 180° C. and the pressure is cautiously released, the solvent beginning to distil off. Any still volatile components are removed by evacuating to 60 mbar for one and a half hours. After cooling, 802 g (99% yield) of a glass-like product with a melting point of 76° C. are obtained.

EXAMPLE 19

700 g of the copolymer prepared in Example 18 were comminuted and heated for 1 hour at 90° C. with 200 g of xylene, 302 g of sodium hydroxide and 1220 g of water. The mixture wall then diluted with 3000 g of cold water and 370 g of 37% hydrochloric acid were added dropwise over a period of one hour. After filtering off with suction and drying at 50° C. under vacuum, a colorless powder with a melting point of 138° C. was obtained.

The products described in the previous section were then tested to determine their effect in the rubber mixtures. A base batch having the following composition (PbW=parts by weight) was used as starting mixture, of which a relatively large amount was prepared:

| 100 PbW | natural rubber |
|---|---|
| 40 PbW | carbon black |
| 15 PbW | active silica |
| 5 PbW | zinc oxide |
| 1 PbW | stearic acid |
| 1 PbW | anti-aging agent |

To prepare the various individual mixtures the particular products to be tested were mixed into the base batch at temperatures between about 80° and 100° C. and then homogeneously dispersed for about 10 minutes at a temperature of about 120° C. The mixing-in of 4 PbW of sulfur and 0.8 PbW of accelerator and of the melamine resin used as curing agent then followed at temperatures below 100° C.

After vulcanization, carried out under the conditions specified for the particular test series, the test pieces obtained were examined for the following properties using the methods customary in the industry:
—ultimate tensile strength, elongation at break and stress values in accordance with DIN 53504
—Shore A hardness according to DIN 53505
—rebound resilience according to DIN 53512
—tear-out force and degree of covering in the steel cord adhesion test.

The results of the last-mentioned adhesion test, which was carried out using a test arrangement in accordance with the recommendation of the Standards Committee designated ISO DP 56003.3, are particularly important. For this purpose steel cord with a 4×0.25 construction with a copper content of the brass coating of 67% was embedded in the adhesion mixture in special molds and this adhesion mixture was then vulcanited. The samples were then stored under different test conditions and the force necessary to tear-out the steel cord filaments from the rubber mixture was then measured. The mean value for the force required to tear out the steel cord from the vulcanized material, calculated from 10 individual tests in each case, is quoted as the test result and additionally the degree of covering is subjectively assessed. The latter is to be understood to mean the area of pulled-out cord covered with rubber, which is subjectively estimated in gradings of 10% (i.e. grading 1, 2, 3 . . . 10 denotes 10, 20, 30 . . . 100% covered cord area). Thus, better adhesion of the rubber mixture to the steel cord is accompanied by higher test figures both for the tear-out force and for the degree of covering.

As is to be seen from the results in Table 1, the rubber mixtures prepared with the products according to the invention in accordance with Example 13, 15 and 16 achieve higher degrees of covering than the comparison with resorcinol. In particular after heat-aging for 14 days at 90° C., the comparative mixture with resorcinol shows a decrease from 80% to about 50%, whilst the mixtures prepared with the copolymers change by not more than 10% to degrees of covering of 70 to 90%. If, in order to simulate unfavorable conditions in practice, the vulcanization time is increased threefold, even more pronounced differences between the comparison and the mixtures according to the invention are then revealed. The degree of covering before additional exposure to heat falls to about 40% in the case of the resorcinol-containing mixture, whilst the mixtures according to the invention achieve 70 to 100%. After a heat-aging at 90° C. over a period of 14 days, the latter decline to degrees of covering of 60 to 90% and are thus clearly better than the comparison with approximately 30%.

TABLE 1

| | | Mixture, prepared with polymer according to Example | | | Comparison mixture with resorcinol |
|---|---|---|---|---|---|
| | | 13 | 15 | 16 | |
| Amount of copolymer or resorcinol added | (PbW) | 2.5 | 2.5 | 2.5 | 2.5 |
| Amount of melamine resin* added | (PbW) | 3.85 | 3.85 | 3.85 | 3.85 |
| Vulcanization at 145° C. | (min) | 60 | 60 | 60 | 60 |
| Ultimate tensile strength | (Mpa) | 17 | 18 | 19 | 16 |
| Elongation at break | (%) | 380 | 390 | 410 | 400 |
| Stress value: | | | | | |
| at 10% elongation | (Mpa) | 1.1 | 1.0 | 1.1 | 0.9 |
| 50% elongation | (Mpa) | 2.2 | 1.9 | 2.0 | 1.7 |
| 100% elongation | (Mpa) | 3.5 | 3.2 | 3.3 | 2.7 |
| Rebound resilience | (DIN 53512) | 41 | 41 | 40 | 38 |
| Shore A hardness | (DIN 53505) | 67 | 66 | 68 | 72 |
| Tear-out force (N cm$^{-1}$)/degree of covering | | | | | |
| After storage 3 d/23° C. | | 370/9 | 390/8 | 380/9 | 400/8 |
| 14 d/90° C. | | 180/9 | 170/7 | 190/8 | 220/5 |
| 3-fold vulcanization time | | | | | |
| After storage 3 d/23° C. | | 310/10 | 320/8 | 350/7 | 330/4 |
| 14 d/90° C. | | 200/9 | 170/6 | 190/7 | 190/3 |

*65 PbW of hexamethoxymethylmelamine per 35 PbW silica

We claim:
1. A rubber composition containing an effective amount of polymers prepared from ethylenically unsaturated monomers by radically initiated polymerization or copolymerization in an organic solvent in the absence of emulsifiers and/or surfactants and obtained in an emulsifier-free, surfactant-free and solvent-free dry state, which polymers contains units of the formula

I

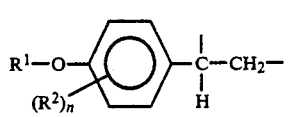

as reinforces resins and adhesion promoters wherein $R^1$ is $CH_3CO-$ which may be partially saponified, $R^2$ is hydrogen or an alkyl or alkoxy of 1 to 4 carbon atoms or halogen or $-CN$ and n is an integer from 1 to 4, with the proviso that if n is $\geq 1$, the $R^2$ can be identical or different, and that at least in some of the units of Formula I, there is a hydrogen atom in at least one of the position vicinal to $R^1-O-$ and an effective amount of a methylene donor cross-linking agent for the polymers containing units of Formula I in the rubber vulcanization process.

2. A composition of claim 1, wherein the polymer comprises units in which $R^1$ is an acetyl group, $R^2$ is hydrogen and n=4.

3. A composition of claim 1, wherein the polymer comprises a mixture of units in which $R^1$ is hydrogen or an acetyl group, $R^2$ is hydrogen and n=4.

4. A composition of claim 1, wherein the polymer comprises units in which $R^1$ and $R^2$ are hydrogen and n=4.

5. A composition of claim 1, wherein the polymer is a mixed polymer that contains units of the formula I, and, in addition, units which are derived from monomers of the formula (II)

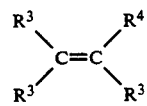
(II)

in which the symbols have the following meaning:
$R^3$ are identical or different radicals from the group comprising hydrogen or an alkyl or an alkoxy group having 1 to 4 carbon atoms or halogen or $-C\equiv N$ or $-COOH$ or $-COO(C_1-C_4\text{-alkyl})$ or

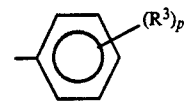

in which p is an integer from 1 to 5, and $R^4=R^3$ or a group

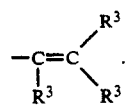

6. A composition of claim 5, wherein copolymers are used which contain units of 4-hydroxystyrene and/or of 4-acetoxystyrene and of butadiene.

7. A composition of claim 6, wherein the copolymer has an average molecular weight $M_w$ of not more than about 150,000.

8. A composition of claim 1, wherein copolymers are used which contain units which are derived from cyclopentadiene or dicyclopentadiene.

* * * * *

UNITED STATES PATENT AND TRADEMARK OFFICE
CERTIFICATE OF CORRECTION

PATENT NO. : 5,288,741
DATED : February 22, 1994
INVENTOR(S) : Albert Bender et al It is certified that error appears in the above-indentified patent and that said Letters Patent is hereby corrected as shown below:

On the title page, item [73] Assignee " Roussel Uclaf, Paris, France" should be changed to read as follows:

--[73] Assignee: Hoechst Aktiengesellschaft--.

Signed and Sealed this

Ninth Day of August, 1994

Attest:

BRUCE LEHMAN

Attesting Officer        Commissioner of Patents and Trademarks